United States Patent
Harres

(10) Patent No.: US 8,417,113 B1
(45) Date of Patent: Apr. 9, 2013

(54) AUXILIARY NETWORK FOR FIBER OPTIC SYSTEM HEALTH MANAGEMENT

(75) Inventor: Daniel N. Harres, Belleville, IL (US)

(73) Assignee: The Boeing Company, Chicago, IL (US)

( * ) Notice: Subject to any disclaimer, the term of this patent is extended or adjusted under 35 U.S.C. 154(b) by 398 days.

(21) Appl. No.: 12/775,960

(22) Filed: May 7, 2010

(51) Int. Cl.
*H04B 10/08* (2006.01)
*H04B 17/00* (2006.01)

(52) U.S. Cl.
USPC .............................................. 398/10; 398/16

(58) Field of Classification Search ................ 398/9, 10, 398/16, 20, 21, 25, 31
See application file for complete search history.

(56) References Cited

U.S. PATENT DOCUMENTS

| | | | |
|---|---|---|---|
| 6,708,004 B1 * | 3/2004 | Homsey | 398/177 |
| 7,011,453 B1 | 3/2006 | Harres | |
| 7,027,685 B2 | 4/2006 | Harres | |
| 7,242,862 B2 * | 7/2007 | Saunders et al. | 398/30 |
| 7,925,162 B2 * | 4/2011 | Soto et al. | 398/60 |
| 2009/0116845 A1 * | 5/2009 | Li et al. | 398/135 |
| 2012/0039598 A1 * | 2/2012 | Dahlfort | 398/13 |

* cited by examiner

*Primary Examiner* — Shi K Li
(74) *Attorney, Agent, or Firm* — Yee & Associates, P.C.

(57) ABSTRACT

In an embodiment, an apparatus comprises a switch configured to control bi-directional communication in a first channel of a fiber optic network between the switch and a number of devices and in a second channel of the fiber optic network between the switch and a number of health assemblies in the number of devices. The fiber optic network comprises a number of lines, each line connecting one of the number of devices to the switch. Each health assembly is configured to send and receive a number of optical signals in the second channel.

25 Claims, 11 Drawing Sheets

AUXILIARY NETWORK FOR FIBER OPTIC SYSTEM HEALTH MANAGEMENT

BACKGROUND INFORMATION

1. Field

The present disclosure relates generally to processing signals and in particular to a method and apparatus for expanding communications by adding a second channel between a switch and a number of devices connected to the switch by a number of lines. Still more particularly, the present disclosure relates to detecting a fault in a fiber optic network without disconnecting any lines in the network.

2. Background

In a number of embodiments, a switch may connect a number of devices by a number of fiber optic lines. The number of fiber optic lines may carry signals in two directions so that the switch controls communication between the number of devices. Design limitations of the switch may result in only a portion of the communication capacity of the number of fiber optic lines being utilized.

An example of a particular environment is a communication environment in which a number of devices are connected to a switch, each device being connected to the switch by a separate fiber optic line. An example of a particular communication environment is an aviation environment in which a number of avionics devices are connected by a number of fiber optic lines to an optical-to-electrical-to-optical switch. Each of the number of avionics devices is connected only to the optical-to-electrical-to-optical switch by one of the number of fiber optic lines. The number of avionics devices share data between each other through the switch.

These fiber optic lines provide for exchange of data and resistance to electromagnetic interference. These fiber optic lines do require testing and maintenance. The testing and maintenance of these fiber optic lines require additional training and equipment. Also, these fiber optic lines require tests to be performed in addition to those for wire lines.

Accordingly, it would be advantageous to have a method and system which takes into account one or more of the issues discussed above as well as possibly other issues.

SUMMARY

An embodiment of the present disclosure provides an apparatus comprising a switch configured to control bi-directional communication in a first channel of a fiber optic network between the switch and a number of devices and in a second channel of the fiber optic network between the switch and a number of health assemblies in the number of devices. The fiber optic network comprises a number of lines, each line connecting one of the number of devices to the switch. Each health assembly may be configured to send and receive a number of optical signals in the second channel. Each of the health assemblies may further comprise a second communication circuit configured to send and receive a first type of the number of optical signals in the second channel, and an optical signal generator configured to send and receive a second type of the number of optical signals in the second channel. An access point on the switch may be configured to link a diagnostic device to the plurality of health assemblies in the switch and to each corresponding health assembly in each device, for conducting a number of bi-directional tests on each of the number of lines without disconnecting any line in the network.

In an embodiment, a method comprises connecting a switch to each of a number of devices in a fiber optic network, wherein the fiber optic network comprises a number of lines, each line connecting one of the number of devices to the switch, configuring the switch to control bi-directional communication in a first channel of a fiber optic network between the switch and the number of devices, configuring the switch to control bi-directional communication in a second channel of the fiber optic network between the switch and a number of health assemblies in the number of devices, and configuring each health assembly to send and receive a number of optical signals in the second channel. The method may further comprise configuring a second communication circuit to send and receive a first type of the number of optical signals in the second channel, configuring an optical signal generator to send and receive a second type of the number of optical signals in the second channel, and configuring an access point on the switch to link a diagnostic device to the plurality of health assemblies in the switch and to each corresponding health assembly in each device, for conducting a number of bi-directional tests on each of the number of lines without disconnecting any line in the network.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
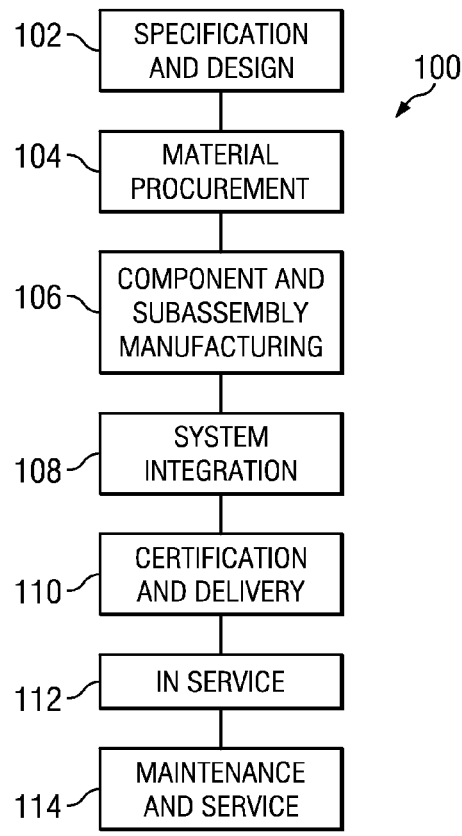
FIG. 1 is an illustration of an aircraft manufacturing and service method in accordance with an advantageous embodiment.
Figure 2:
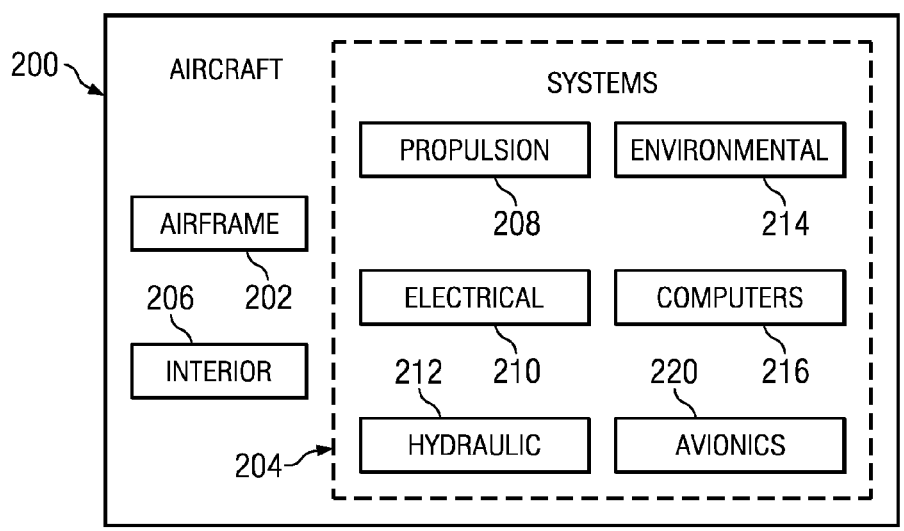
FIG. 2 is an illustration of an aircraft in accordance with an advantageous embodiment.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in accordance with an advantageous embodiment. In this example, aircraft 200 may be produced by aircraft manufacturing and service method 100 in FIG. 1 and may include airframe 202 with a plurality of systems 204 and interior 206. Examples of plurality of systems 204 include one or more of propulsion 208, electrical 210, hydraulic 212, environmental 214, computers 216, and avionics 220. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 100 in FIG. 1. As used herein, "a number" means one or more. As used herein, "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1. The different advantageous embodiments recognize and take into account a number of different considerations. For example, in order to test a fiber optic line for faults, the fiber optic lines must be disconnected at a connection, exposing the connection to environmental pollutants.

The different advantageous embodiments recognize and take into account a number of problems. By way of example, a problem is that locating certain faults can only be done with the avionics devices and switches exchanging information about their measurements. Another problem is that certain types of faults require that the most recent measurements for a line be compared to archived measurements for the line, thus requiring significant data storage.

The different advantageous embodiments recognize and take into account that storing data for comparison of current readings to archived readings requires storage and that there is limited storage in the avionics devices. The different advantageous embodiments recognize and take into account that the processing units in the switch may store data in storage located at the switch. The stored data may be performance data for a line recorded during a flight or during non-flight maintenance. The stored data may be test data stored during a flight or during non-flight maintenance. The stored data may be values derived from the function of the particular avionics device.

The different advantageous embodiments recognize and take into account that fault detection in the number of fiber optic lines may require disconnecting one or more lines at a connection, exposing connectors to pollutants in the environment.

The different advantageous embodiments recognize and take into account that a single access point may be provided for a technician to download health information about the fiber optic network. In order to have a single access point at the switch, bi-directional communication must take place between each avionics device and the switch.

The different advantageous embodiments recognize and take into account that a fault may be a damaged portion of the line or a damaged connector in the line. The different advantageous embodiments recognize and take into account that a damaged portion of a fiber optic line will reflect at least a portion of the light traveling along the line back along the line in a direction opposite the direction from which such light came. Because of the foregoing reflection, optical time domain reflectometers (OTDRs) may locate damaged portions of fiber optic lines to within a given range of distance relative to known points along such lines.

The different advantageous embodiments recognize and take into account that comparing optical time domain reflectometer results means exchanging information, and that the message size is suitable for a low data rate transmission. The different advantageous embodiments recognize and take into account that modulating a laser bias current, or a bi-directional communication circuit, may accomplish low-rate communication. A low-rate communication may be 100 kilobits per second (kbps) or less. The low-rate data may require less than one percent of total optical power to be made available for such an auxiliary channel. Therefore, any performance effect on the main channel's high-speed data may be considered immeasurable.

Figure 3:
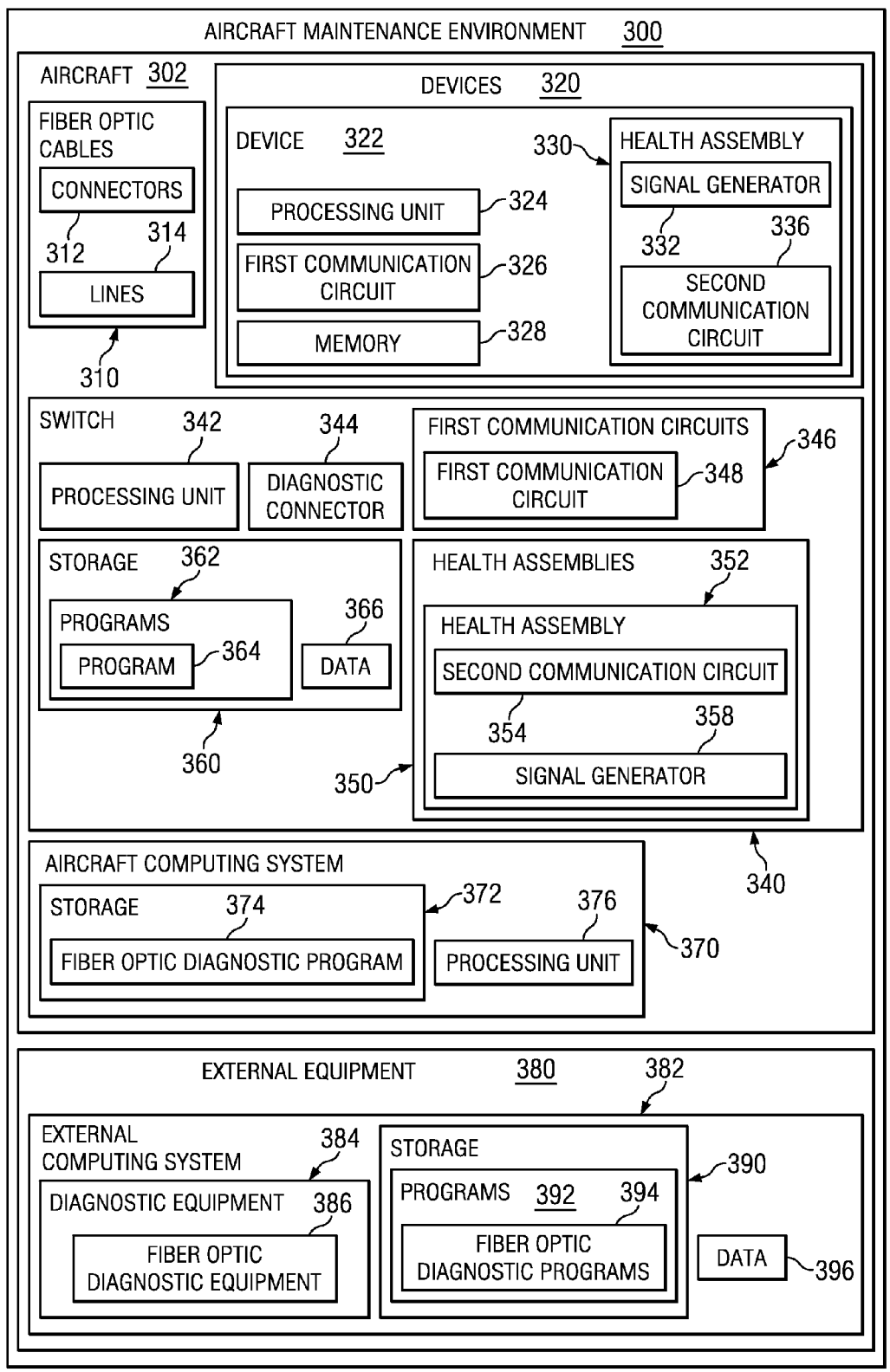
FIG. 3 is an illustration of an aircraft maintenance environment in which an advantageous embodiment may be implemented.

FIG. 3 is an illustration of an aircraft maintenance environment in which an advantageous embodiment may be implemented. Aircraft maintenance environment 300 may include aircraft 302 and external equipment 380. External equipment 380 may comprise external computing system 382. External computing system 382 may comprise diagnostic equipment 384 and storage 390. Diagnostic equipment 384 may comprise fiber optic diagnostic equipment 386. Storage 390 may comprise programs 392 and data 396. Programs 392 may comprise fiber optic diagnostic programs 394.

Aircraft 302 may comprise fiber optic cables 310, devices 320, switch 340, and aircraft computing system 370. As used herein, "devices" refers to any hardware or combination of hardware and software used for navigation, communication, display of data, and any other specialized function of a system fitted to an aircraft to meet a specialized need. For example, a specialized need may include, without limitation, a tactical system for an early warning radar, an aircraft flight control system, a collision-avoidance system, a weather radar, a lightning detector, a forward looking infrared, and a passive infrared device.

Fiber optic cables 310 may comprise connectors 312 and lines 314. As used herein, the term "line" means a fiber optic line, wherein a fiber optic line is a cylindrical dielectric waveguide configured to transmit light along an axis with total internal reflection. The fiber optic line comprises a core surrounded by a cladding, both of which are made of dielectric materials, where the refractive index of the core is greater than that of the cladding. Devices 320 may comprise a number of devices such as device 322. By way of example, device 322 comprises processing unit 324, first communication circuit 326, memory 328, and health assembly 330. Health assembly 330 further comprises signal generator 332 and second communication device 336. Switch 340 comprises processor unit 342, diagnostic connector 344, first communication circuits 346, health assemblies 350, and storage 360. First communication circuits 346 may comprise a number of first communication circuits such as first communication circuit 348. In an example, signal generator 332 may be an optical time domain reflectometer.

In an illustrative example, switch 340 may be an electrical-to-optical-to-electrical (OEO) switch. In an example, diagnostic connector 344 may be an access point on the switch configured to link a diagnostic device to the plurality of health assemblies in the switch and to each corresponding health assembly in each device. The diagnostic device may be fiber optic diagnostic equipment 386, or some other diagnostic equipment in diagnostic equipment 384 of external equipment 380. The different advantageous embodiments recognize and take into account that the access point on the switch may be configured to link a diagnostic device to the plurality of health assemblies in the switch and to each corresponding health assembly in each device, for conducting a number of bi-directional tests on each of the number of lines without disconnecting any line in the network. The different advantageous embodiments recognize and take into account that the second communication circuit 336 may be integrated into first communication circuit 326.

In these examples, a processor unit may be a number of processors, a multi-processor core, or some other type of processor, depending on the particular implementation. In these examples, a processor unit may be implemented using a number of heterogeneous processor systems in which a main processor is present with secondary processors on a single chip. As another illustrative example, a processor unit may be a symmetric multi-processor system containing multiple processors of the same type. In these examples, switch 340 is configured to control bi-directional communication in a first channel of a fiber optic network between switch 340 and devices 320 and in a second channel of the fiber optic network between the switch 340 and the number of health assemblies 330 in devices 320.

Each line 314 in the fiber optic network connects one of devices 320 to switch 340. Each health assembly 330 is configured to send and receive a number of optical signals in the second channel. Each health assembly 330 has second communication circuit 336 configured to send and receive a first type of the number of optical signals in the second channel, and signal generator 332 which may be an optical signal generator configured to send and receive a second type of the number of optical signals in the second channel.

Storage 360 comprises programs 362 and data 366. Programs 362 further comprise program 364. Health assemblies 350 comprise a number of health assemblies, such as health assembly 352. By way of example, health assembly 352 comprises second communication circuit 354 and signal generator 358. Aircraft computing system 370 comprises storage 372 and processing unit 376. Storage 372 comprises fiber optic diagnostic program 374.

The illustration of aircraft maintenance environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

One example of an aircraft maintenance environment such as aircraft maintenance environment 300 is a commercial airline maintenance facility at a commercial airport. Another example may be a military aircraft maintenance facility at an airbase in the United States. Another example may be a military aircraft maintenance facility on a ship or aircraft carrier. A further example may be a military aircraft maintenance facility at a forward operating base.

For example, although the different advantageous embodiments have been described with respect to aircraft, the different advantageous embodiments also recognize that some advantageous embodiments may be applied to other types of platforms. The platforms may be any platform for which information is needed about optical signals and lines carrying the optical signals in layers within the platform.

The information may be used in the maintenance, reworking of parts, testing of parts, and other suitable purposes. The platform may be, for example, without limitation, a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

Figure 4:
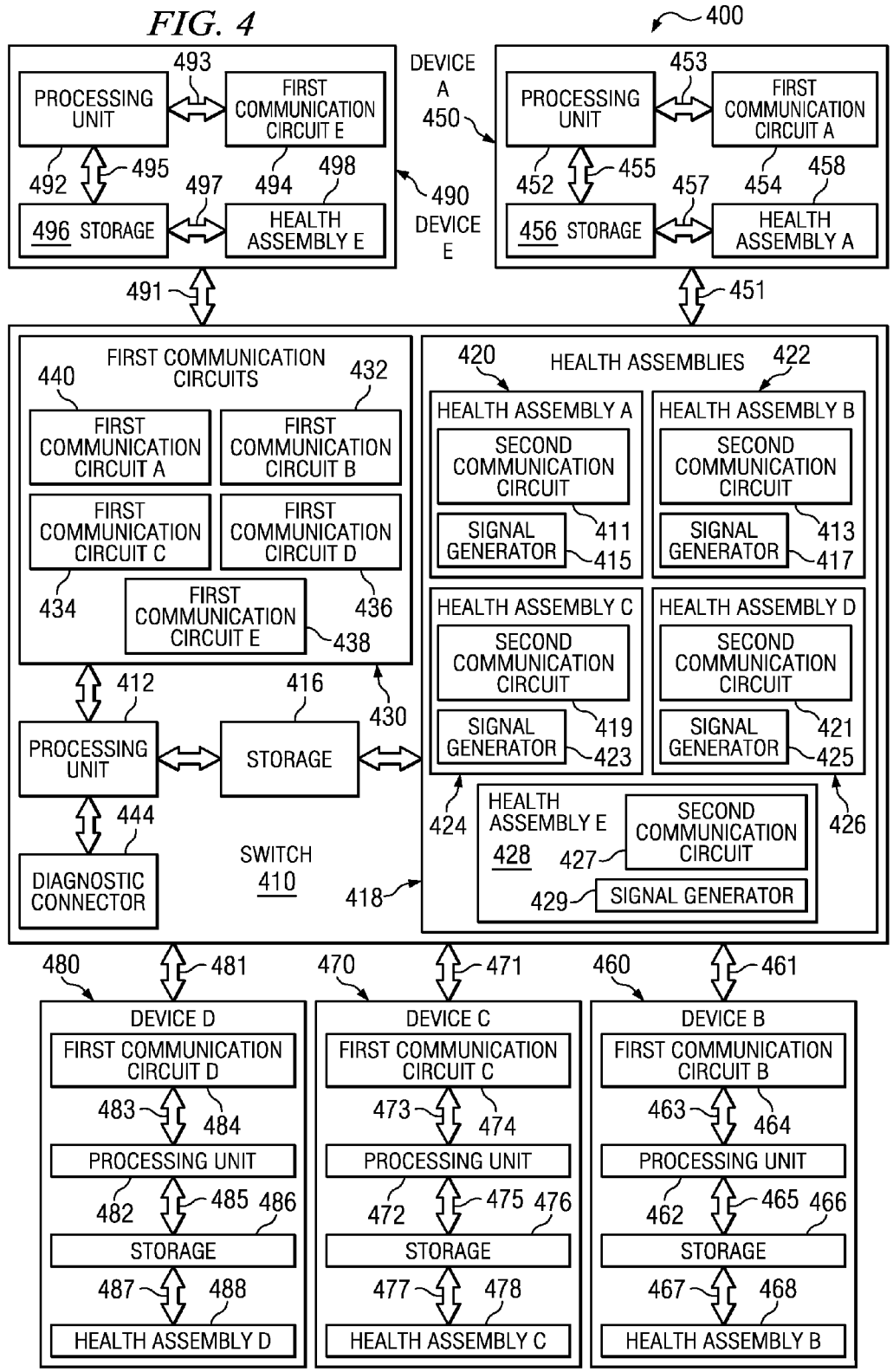
FIG. 4 is an illustration of an aircraft avionics system in which an advantageous embodiment may be implemented.

FIG. 4 is an illustration of an aircraft system in which an advantageous embodiment may be implemented. Network 400 comprises switch 410, device A 450, device B 460, device C 470, device D 480, and device E 490. Switch 410 may be a switch such as switch 340 in FIG. 3. Switch 410 comprises processing unit 412, storage 416, first communication circuits 430, health assemblies 418, and diagnostic connector 444. Processing unit 412 may be a processing unit such as processing unit 324 in FIG. 3. First communication circuits 430 may be one of first communication circuits 326 in device 322 in FIG. 3. First communication circuits 430 comprises first communication circuit A 440, first communication circuit B 432, first communication circuit C 434, first communication circuit D 436, and first communication circuit E 438. First communication circuit A 440 corresponds to first communication circuit A 454 in device A 450. First communication circuit B 432 corresponds to first communication circuit B 464 in device B 460.

Diagnostic connector 444 may be an access point on the switch configured to link a diagnostic device to the plurality of health assemblies in the switch and to each corresponding health assembly in each device. The different advantageous embodiments recognize and take into account that the access point on the switch may be configured to link a diagnostic device to the plurality of health assemblies in the switch and to each corresponding health assembly in each device, for conducting a number of bi-directional tests on each of the number of lines without disconnecting any line in the network. In an advantageous embodiment, diagnostic connector 444 may be connected to processing unit 412. In another advantageous embodiment, diagnostic connector 444 may be connected directly to each health assembly in health assemblies 418. In a further advantageous embodiment, diagnostic connector 444 may be connected directly to any of processing unit 412, storage 416, first communication circuits 430, and health assemblies 422.

First communication circuit C 434 corresponds to first communication circuit C 474 in device C 470. First communication circuit D 436 corresponds to first communication circuit D 484 in device D 480. First communication circuit E 438 corresponds to first communication circuit E 494 in device E 490. In these illustrative examples, "correspond" means to have a single line between each of the number of first communication circuits 430 in switch 410 and each first communication circuit in each circuit.

In this example, a first communication circuit is shown in switch 410 for each of the devices, and each of the devices has its own first communication circuit linked by a single line to one of the first communication circuits in the switch. In another illustrative example, a single first communication circuit in switch 410 may be connected to each of the first communication circuits in each of the circuits by switch 410 so that only the one first communication circuit in the switch and one of the first communication circuits in the one of the circuits may communicate at one time. As used herein, when a first component is connected to a second component, the first component may be connected to the second component without any additional components. The first component also may be connected to the second component by one or more other components. For example, one electronic device may be connected to a second electronic device without any addition electronic devices between the first electronic device and the second electronic device. In some cases, another electronic device may be present between the two electronic devices connected to each other.

In an illustrative example, correspondence may be established by two way communication through a line. In another example, correspondence may be established by a one way communication in a first direction on first fiber of a line and by a second one way communication in a second direction on a second fiber of the line.

Health assemblies 418 comprise health assembly A 420, health assembly B 422, health assembly C 424, health assembly D 426, and health assembly E 428. Health assembly A 420 comprises second communication circuit 411 and signal generator 415. Health assembly B 422 comprises second communication circuit 413 and signal generator 417. Health assembly C 424 comprises second communication circuit 419 and signal generator 423.

Health assembly D 426 comprises second communication circuit 421 and signal generator 425. Health assembly E 428 comprises second communication circuit 427 and signal generator 429. In an example, each of the number of health assemblies in the switch exchanges a number of parameters with each of the number of corresponding health assemblies for each of the number of lines.

In the illustrative example in FIG. 4, all of the health assemblies in each of the devices exchange data through switch 410 along separate lines. For example, device A 450 connects for communication to switch 410 by line 451. Device B 460 connects for communication to switch 410 by line 461. Device C 470 connects for communication to switch 410 by line 471. Device D 480 connects for communication to switch 410 by line 481. Device E 490 connects for communication to switch 410 by line 491.

In the example, device A 450, device B 460, device C 470, device D 480 and device E 490 are the only devices connected to switch 410. Within each of the foregoing devices, a processing unit controls the first communication circuit and storage so that data received from the first communication circuit can be stored, passed on to another device through switch 410, or stored and passed to another device through switch 410.

In the example of FIG. 4, device A 450 has processing unit 452 connected to first communication circuit 454, storage 456, and health assembly A 458 by lines 453, 455, and 457. Device B 460 has processing unit 462 connected to first communication circuit 464, storage 466, and health assembly B 468 by lines 463, 465, and 467. Device C 470 has processing unit 472 connected to first communication circuit 474, storage 476, and health assembly C 478 by lines 473, 475, and 477.

Device D 480 has processing unit 482 connected to first communication circuit 484, storage 486, and health assembly D 488 by lines 483, 485, and 487. Device E 490 has processing unit 492 connected to first communication circuit 494, storage 496, and health assembly E 498 by lines 493, 495, and 497.

The different advantageous embodiments recognize and take into account that any number of devices may be connected to switch 410, each device being connected by a single line between the device and the switch 410, limited only by a number of ports available for lines in switch 410. The different advantageous embodiments further recognize and take into account that processing units 452, 462, 472, 482, and 492 may be configured to control first communication circuits A 454, B 464, C 474, D 484, and E 494. The different advantageous embodiments further recognize and take into account that processing units 452, 462, 472, 482, and 492 may be configured to control health assembly A 458, health assembly B 468, health assembly C 478, health assembly D 488, and health assembly E 498.

The different advantageous embodiments further recognize and take into account that each of the number of health assemblies, such as health assembly A 458, health assembly B 468, health assembly C 478, health assembly D 488, and health assembly E 498 may be provided with an internal processing unit for operation independent of the central processing units of the devices.

The different advantageous embodiments recognize and take into account that health assembly A 458, health assembly B 468, health assembly C 478, health assembly D 488, and health assembly E 498 may be controlled by processing unit 412 of switch 410. The different advantageous embodiments recognize and take into account that health assembly A 458, health assembly B 468, health assembly C 478, health assembly D 488, and health assembly E 498 may be controlled by processing unit 412 of switch 410 in combination with one or more of processing units 452, 462, 472, 482, and 492.

In an example, a first channel may be configured to transmit data over a first range of data transmission rates and a second channel may be configured to transmit data over a second range of data transmission rates. In the example, the first range of data transmission rates is used for communications between first communication circuits and first communication circuits. In the example, the second range of data transmission rates is used for communications between health assemblies and a switch.

Data communicated in the second channel may be performance data or may be fault detection data. Performance data is received from a processor of the device or from storage in the device. Fault detection data is received after a signal is generated by a health assembly. The fault detection data is received by a corresponding health assembly.

In an illustrative example, the first communication circuit in the device may be turned off when the first optical signal is sent in the first direction, the first communication circuit in the switch is turned off when the second optical signal is sent in the second direction, and a processor in the switch compares the first measurement to the second measurement to locate a fault.

A first measurement and a second measurement may be each generated without disconnecting any fiber optic connection in the fiber optic network.

A first data transmission rate range may have a highest value of 100 kbps. A second data transmission rate range may have a lowest value of 1 Gbps. In the illustrative examples of FIG. 3 and FIG. 4, each of the number of health assemblies in the switch are connected to the corresponding health assembly in the corresponding device by a corresponding line of the number of lines.

In the illustrative examples of FIG. 3 and FIG. 4, health assemblies in the switch interact with the number of corresponding health assemblies in each of the number of devices to determine a number of locations of a number of faults in a number of corresponding lines. In the illustrative examples, fault detection is accomplished by a number of signal generators such as signal generator 358 in health assembly 352 of FIG. 3. In the illustrative examples of FIG. 3 and FIG. 4, each of the health assemblies has a signal generator.

Figure 5:
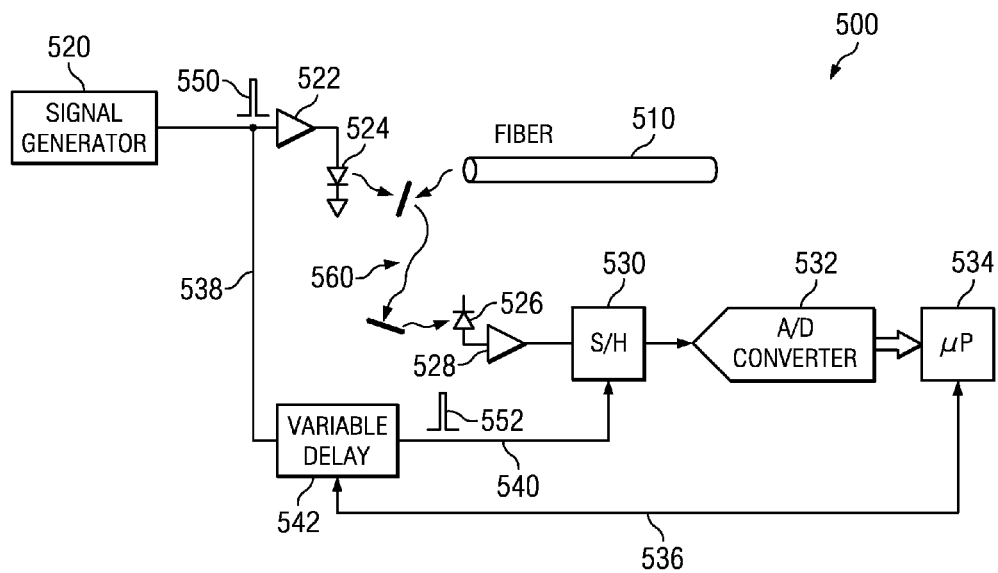
FIG. 5 is an illustration of a signal generator system in accordance with an advantageous embodiment.

FIG. 5 is an illustration of a signal generator system in accordance with an advantageous embodiment. In an example, signal generator system 500 may be signal generator 332 of device 322 in FIG. 3. In an example, signal generator system 500 may be signal generator 358 of switch 340 in FIG. 3. In an example, signal generator system 500 may be a signal generator such as each of the signal generators in health assembly's A 420 through D 426 in switch 410 in FIG. 4. In an example, signal generator system 500 may be each of the signal generators in health assembly A 458 through E 498 in devices A 450 through E 490 in FIG. 4. Signal generator system 500 includes signal generator 520 for sending a light signal such as light signal 550 through amplifier 522 and diode 524. In an illustrative example, amplifier 522 is a light drive amplifier and diode 524 is a light emitting diode. Signal 550 is sent through line 510. When signal 550 is sent through line 510, a delay signal 552 is sent to sample and hold device 530. Delay signal 552 informs sample and hold device 530 of how much of delay should be encountered before receiving a reflected signal back through line 510, diode 526, and receiver 528. If a reflected signal is returned through line 510, diode 526, and receiver 528 to sample and hold device 530 where processor 506 determines if the reflected signal meets a threshold to be analyzed, and if so, the reflected signal is captured by sample and hold device 530.

If no reflective signal is received during the delay period indicated by delay signal 552, then no fault has been detected in the line 510. Once delay signal 552 is captured by sample and hold device 530, delay signal 552 is converted from analog to digital 532 and passed to processor 534. Processor 534 analyzes delay signal 552 to determine a fault location.

In addition, processor 534 controls variable delay 542 and informs variable delay 542 of the amount of delay to send in signal 552 to sample and hold device 530. In an example, processor 534 connects to variable delay device 542 by electrical connection 536, variable delay device 542 connects to sample and hold device 530 by electrical connection 552 and to signal generator 520 and amplifier 522 by electrical connection 538.

Figure 6:
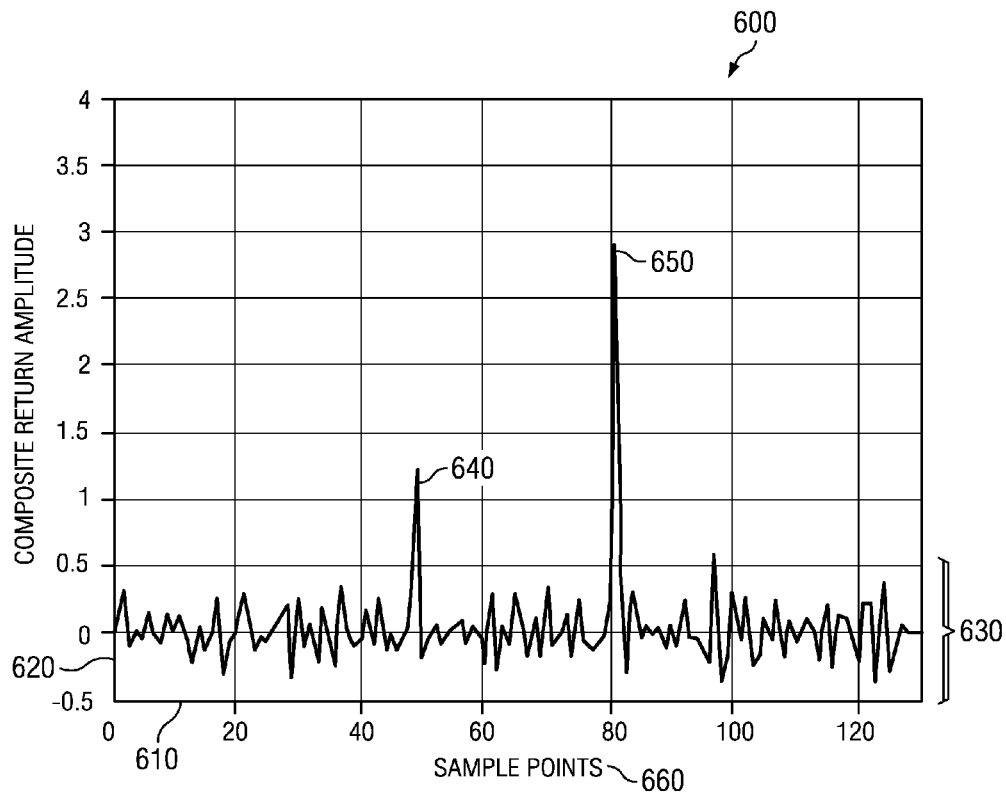
FIG. 6 is an illustration of a graph of a composite return versus sample points in accordance with an advantageous embodiment.

FIG. 6 is an illustration of a graph of a composite return versus sample points in accordance with an advantageous embodiment. In the illustrative example of FIG. 6, a signal generator may be signal generator 520 or any of the signal generators in the number of health assemblies of the switch or in the number of health assemblies in the number of devices.

A signal such as signal 550 in FIG. 5 is sent in a first direction along a line such as line 510 in FIG. 5. A reflected signal such as signal 560 is received. Composite return amplitude is shown in FIG. 6 plotted on "y" axis 620 against sample points 660 plotted on "x" axis 610. Sample points 660 represent points along a line such as line 510 in FIG. 5. Sample points 660 may be distances along line 510 or may be other correlations to line 510 by which a fault in line 510 may be located. Signals in range 630 are ignored. Signal 650 at sample point 80 and signal 640 at sample point 48 are indicators that faults may be located at those points.

The illustrative examples recognize and take into account that a pulse by a signal generator, such as an optical time domain reflectometer, may cause reflections at a glass-air boundary that can be used to detect fiber breaks or contamination or other problems at connectors. The illustrative embodiments recognize and take into account that a reflected pulse from a line having multiple connectors and the multiple connectors may affect the signal, making it difficult to locate the actual fault. The illustrative examples recognize and take into account that measurements of reflected light from a light signal may be used in conjunction with and compared to prior measurements to determine a location of a connector fault.

The different advantageous embodiments recognize and take into account that optical time domain reflectometers typically operate by sending a very short-duration, high-power laser signal along the optical line, and by thereafter observing the returned reflections from the signal. Although portions of the signal are also reflected back by such things as connectors that are used to join individual sections of a fiber optic line, by comparing the observed time domain reflection response to the time domain response that would be expected had the line not been damaged, the portion of the signal reflected by the damaged portion of the line can be ascertained. The time delay between the emission of the laser signal and the detection of its partial reflection back from the damaged portion of the line can then be utilized to determine how far such light traveled, and hence the distance to the damaged portion.

The different advantageous embodiments also recognize and take into account that the fiber optic lines are typically composed of long sections of clad fiber with connectors at either end to optically and mechanically couple one section of line to the next and to connect the line to fiber optic components, such as transmitters and receivers. By way of example, these connectors are susceptible to damage, contamination, and other types of degradation.

The different advantageous embodiments recognize and take into account that depending on the type of degradation, the connector will either reflect or absorb, or both, an amount of light that would otherwise be transmitted through the connector. By way of example, a connector that is contaminated with grease might exhibit mostly absorption. By further way of example, another connector contaminated with a pollen grain or grains might exhibit some reflection as well as some absorption. As an example, an improperly seated connector may be almost non-reflective. If the amount of energy absorbed or reflected is too great, the degradation causes the line to fail. If instead the amount of energy is not enough to completely fail the line, the degradation decreases the signal to noise ratio of the line and, accordingly, limits the line's bandwidth.

The different advantageous embodiments recognize and take into account that contamination of a connector in a fiber optic line may partially obscure the glass fiber surface at the connector interface. Depending on the substance, the additional loss at the connector interface can be either due to reflection or to absorption, or it can be a combination of the two.

The different advantageous embodiments recognize and take into account that waveforms may show expected changes in an optical time domain reflectometer trace for various types of contamination, and that waveforms may differ when a first light signal is launched from a first direction and when a second light signal is launched from a second direction.

The different advantageous embodiments recognize and take into account that an ambiguity may result because the absorption and reflection may make a connector near a contaminated connector appear to be the cause of the fault. The different advantageous embodiments recognize and take into account that such an ambiguity may be resolved by comparing the results of performing the optical time domain reflectometry at both ends of the fiber optic line.

Figure 7:
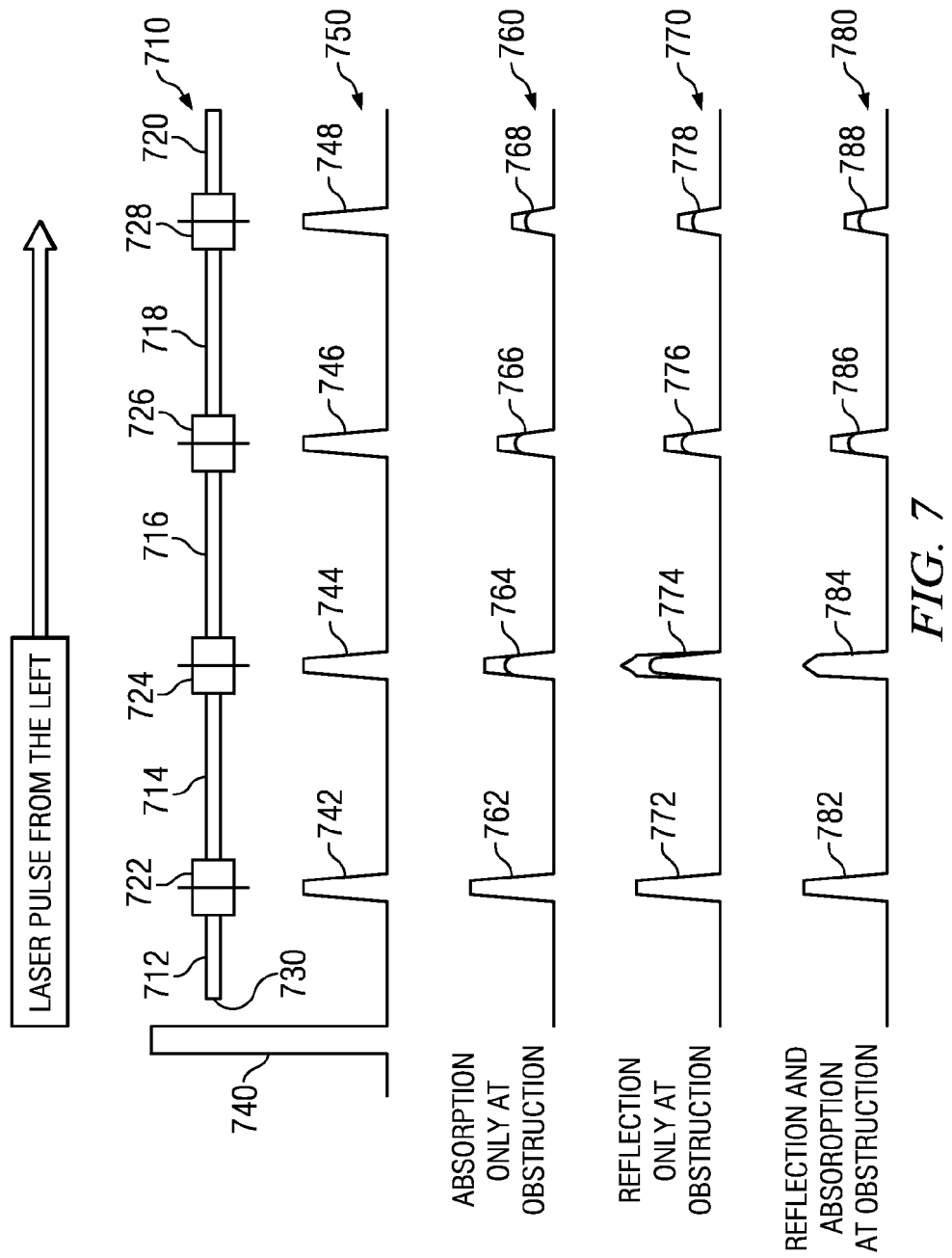
FIG. 7 is an illustration of an identification of an obstruction with a signal from a first direction in accordance with an advantageous embodiment.

FIG. 7 is an illustration of an identification of an obstruction with a signal from a first direction in accordance with an advantageous embodiment. In an example, FIG. 7 illustrates fiber optic connector faults. Line 710 includes a plurality of sections 712-720, each of which is connected to adjacent sections by connectors 722-728. Sections 712 and 720 may each include an additional connector that is not shown for connecting to additional sections of line that are not shown, to a switch such as switch 340 in FIG. 3, switch 410 in FIG. 4, to any of number of devices 320 in FIG. 3, or to any of devices 450 through 490 in FIG. 4.

Each connector 722 through 728 may reflect some light back along line 710 in the direction from which the light was transmitted. In an example, an optical signal may be a laser pulse originating from the left of line 710. Thus, an optical signal such as optical signal 740 sent along line 710 from end 730 will encounter connectors 722 through 728. Each of connectors 722 through 728 may reflect part of optical signal 740 back toward end 730.

Reflections 742-748 from connectors 722 through 728 travel back to end 730 where optical signal 740 was introduced into line 710. Thus, optical signal 740 may cause a waveform, such as waveform 750, having reflective signals 742-748 arriving at end 730 of line 710 in an order corresponding to the numerical order, and each separated by an amount of time required for the signal to travel between adjacent connectors to end 730 of line 710. Waveform 750 is an example of a waveform without any faults in any of the connectors.

Waveform 760 illustrates an effect caused by absorption at an obstruction at connector 724. Absorption may be referred to as degradation of optical signal 740 by absorption. While optical signal 740 causes reflection 762 from connector 722 in a normal fashion, optical signal 740 is partially absorbed by connector 724.

Accordingly, reflection 764 from connector 724 is attenuated by the defect in connector 724. The defect in connector 724 may be caused by contamination or some other form of degradation. Attenuated optical signal 740 continues traveling along line 710 and encounters connector 726 and then connector 728. Because the incident light at these subsequent connectors 726 and 728 is attenuated, the reflections 766 and 768 exhibit an attenuated amplitude or intensity as shown in waveform 760. Assuming that no other degraded connectors are present, it is possible to positively identify connector 724 as the location of the degradation based on the presence of the first attenuated reflection 764 corresponding to connector 724.

Waveform 770 shows the effect that a reflective degradation of connector 724 causes. The first affected reflection 774 after normal reflection 772 shows a higher than normal amplitude because the reflection from the source of the degradation superimposes on the reflection from connector 724. However, reflections 776 and 778 from the subsequently encountered connectors are attenuated because optical signal 740 leaving degraded connector 724 is attenuated by the amount of the reflection from the source of the degradation in addition to any additional attenuation from connector 724.

If no other degraded connectors are present, connector 724 may be positively identified as the location of the reflective degradation due to the presence of the more intense reflection 774 followed by the attenuated reflections 776 and 778.

Thus, in the absence of other degraded connectors besides 724 and in the presence of a degraded connector characterized substantially by either reflectance or absorption, it is possible to positively locate such a degraded connector. If a reflection is attenuated, the corresponding connector suffers from a degradation characterized by absorption.

If a reflection is larger or more intense than normal and is followed by an attenuated reflection, the connector that corresponds to the accentuated reflection is the location of a reflective degradation. However, where the source of the degradation causes both reflectance and absorption, the previously stated rules for locating the fault, or degradation, can fail.

By way of example, waveform 780 illustrates this situation. For waveform 780, connector 724 has a fault that causes both a reflection and absorption. Thus, when optical signal 740 arrives at connector 724, the increase in the reflection due to the reflectance of the degradation is canceled by the attenuation due to the degradation. The resulting reflection 784, after normal reflection 782, approximates a reflection such as reflection 742. Subsequent reflections 786 and 788 may exhibit an attenuated amplitude because of absorbed light at connector 724.

Reflection 784 may not appear to be degraded. Instead, the attenuation of subsequent reflections 786 and 788 may be noted. Accordingly, it may be concluded that connector 726, corresponding to the first attenuated reflection 786, will be incorrectly identified as the location of the degradation.

Further, the degradation will be incorrectly identified as a purely absorptive degradation. Thus, not only the location but also the likely source of the root cause of the problem will be misidentified. In such situations, another connector than the degraded connector may be replaced, cleaned, or otherwise repaired, thereby leaving degraded connector 724 in service without corrective action. With the possibility that some sources of degradation cause both reflectance and absorption of the light arriving at a connector such as connector 724, it is only possible to locate the source of the degradation of one of two connectors: the connector exhibiting the first attenuated reflection, or connectors 724 and 726.

Figure 8:
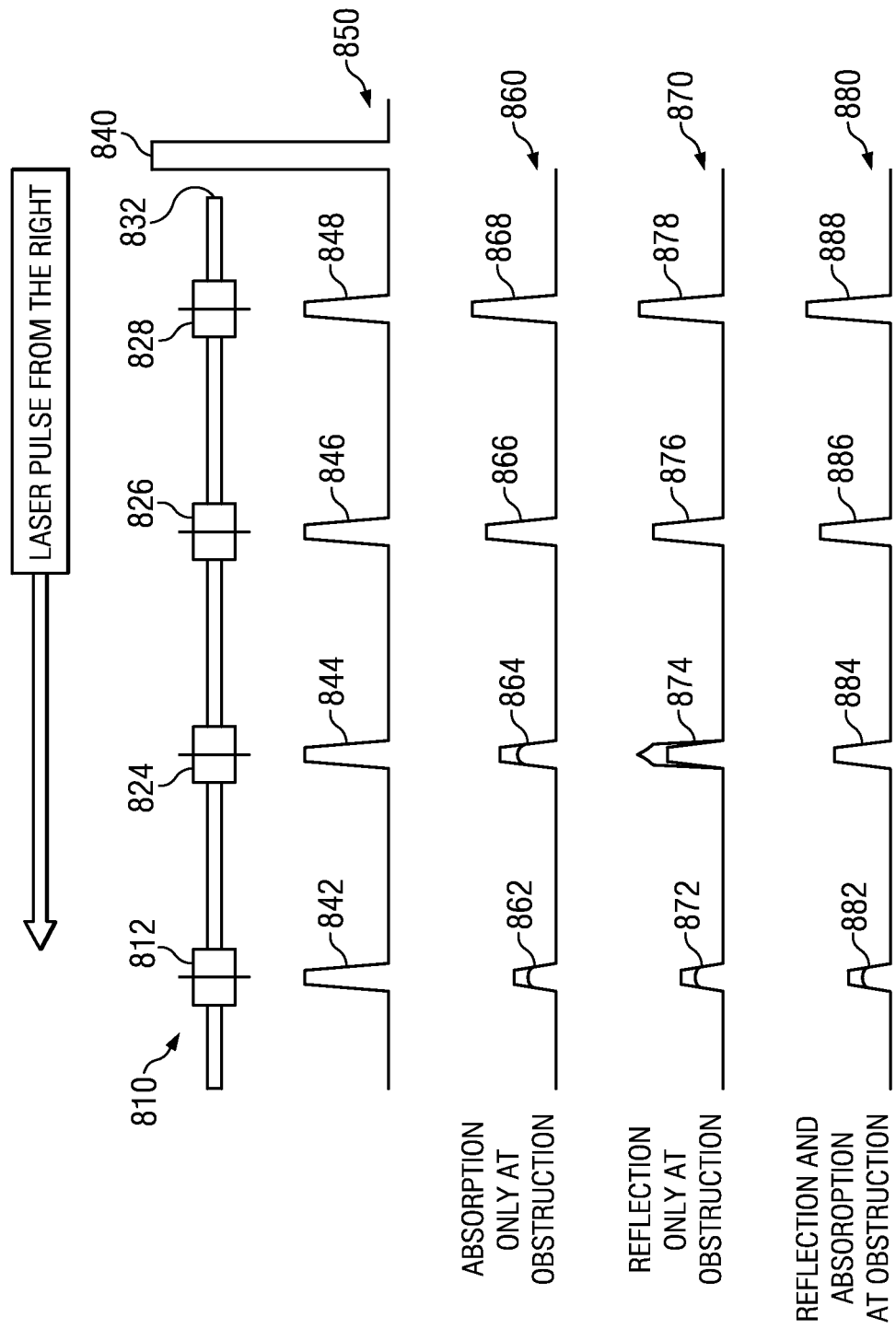
FIG. 8 is an illustration of an identification of an obstruction with a signal from a second direction in accordance with an advantageous embodiment.

FIG. 8 is an illustration of an identification of an obstruction with a signal from a second direction in accordance with an advantageous embodiment. Optical signal 840 may be generated by signal generator 332 in FIG. 3 or by one of the signal generators in health assembly A 458 through health assembly E 498 in FIG. 4. In FIG. 8, optical signal 840 is introduced into line 810 from end 832. Line 810 has a fault at connector 824. Connector 824 may be identified as the location of the degradation and the effects of optical signal 840 are illustrated. If no connectors suffer from degradation, waveform 850 results and includes a series of reflections 842, 844, 846, and 848. However, if connector 824 is degraded with a source that causes only absorption, then reflection 864 and subsequent reflection 862 will be attenuated while reflection 868 and reflection 866 are normal, as shown in waveform 860. Referring to waveform 870, if connector 824 has a fault that causes a reflection so that connector 824 reflects more light than is normal, the result is that attenuated reflection 874 may be associated with faulty connector 824 and subsequent reflection 872 will be attenuated while reflection 878 and reflection 876 are normal. Referring to waveform 880, if connector 824 is degraded so that a fault causes reflection and absorption, the resulting waveform 880 includes a reflection 884 that appears normal and a subsequent reflection 882 that is attenuated, while reflection 888 and reflection 886 are normal. As discussed above, in regard to a signal introduced from the left, and in this case for a signal introduced from the right, a connector suffering a degradation characterized by both reflectance and absorption may not be identified as the source of the fault. However, when optical signal 740 from the left and optical signal 840 from the right are analyzed together, the affected connector 824 may be positively identified as the source of two types of degradation.

In an example, transmitting optical signal 740 from the left causes an attenuated subsequent reflection 786 corresponding to connector 726 and transmitting optical signal 840 from the right in the opposite direction causes attenuated reflection 882 corresponding to a different subsequent connector 822. Where the different optical signals 740 and 840 reveal different subsequent connectors such as connectors 822 and 824, the connector that is suffering from a dual degradation is connector 824 between the two connectors 822 and 826.

Another manner in which to phrase the rule for identifying the degraded connector is as follows: the intersection of two sets of potentially degraded connectors identifies the actual degraded connector when the sets of connectors are identified by transmitting optical signals along the line in opposite directions.

In an illustrative example, a first time period may be a time period in which a health assembly in one of the devices sends a first optical signal to a corresponding health assembly in the switch to make a first measurement on a line in a first direction and in which the corresponding health assembly in the switch sends a second optical signal to the corresponding health assembly on the line to make a second measurement in a second direction.

In an illustrative example, a second time period may be a time period in which the health assembly sends a third optical signal to the corresponding health assembly in the switch to make a third measurement on the line in a first direction and in which the corresponding health assembly in the switch sends a fourth optical signal to the corresponding health assembly to make a fourth measurement on the line in the second direction.

In an illustrative example, the first measurement and the second measurement may be stored in the switch to comprise a first set, and the third measurement and the fourth measurement may be stored in the switch to comprise a second set. In another illustrative example, a fault may be located by analyzing a number of differences identified by comparing the first set and the second set.

The different advantageous embodiments recognize and take into account that in order to compare current optical time domain reflectometer readings to archived optical time domain reflectometer readings, there is a need to archive waveforms each time measurements are taken. In order to store past waveforms, nonvolatile memory is needed at each communication circuit. Communication circuits such as transceivers have microcontrollers that typically do not have sufficient capacity to store many waveforms. The different advantageous embodiments recognize and take into account that a RAMTRON® FM24V10 nonvolatile memory, for example, at a storage node, could store multiple historical optical time domain reflectometer waveforms for multiple nodes in a network.

Figure 9:
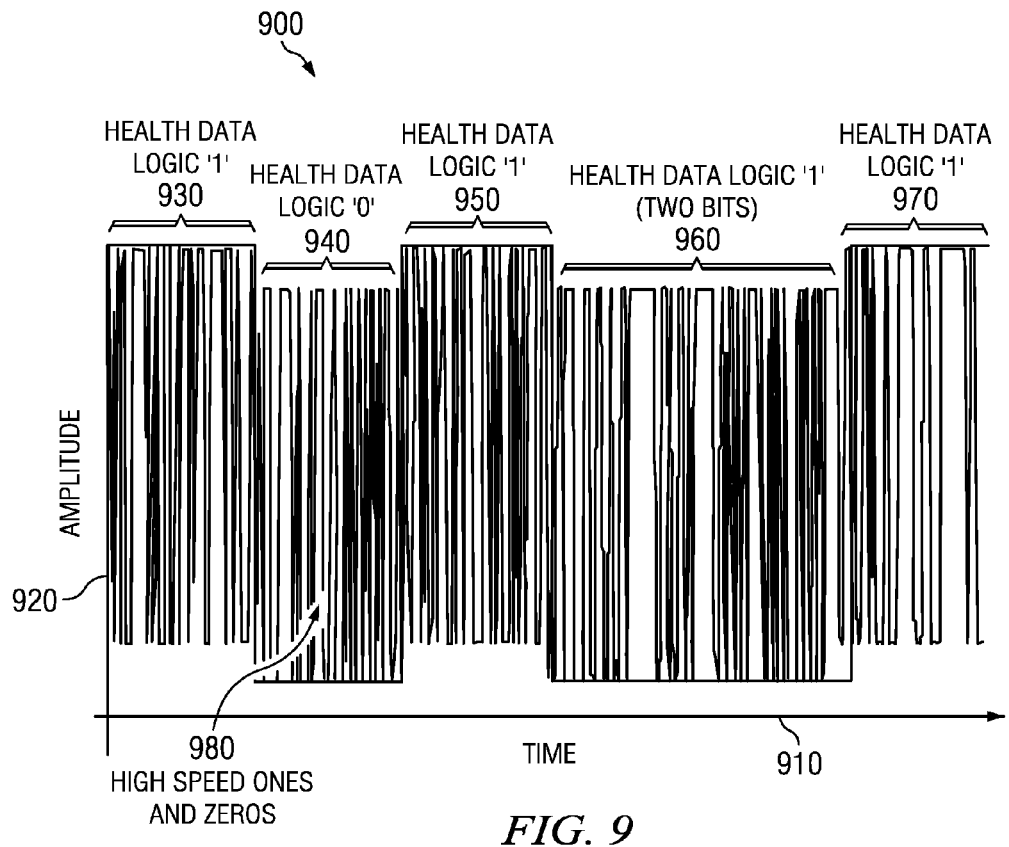
FIG. 9 is an illustration of a graph of amplitude versus time showing a first channel and a second channel in accordance with an advantageous embodiment.

FIG. 9 is an illustration of a graph of amplitude versus time in accordance with an advantageous embodiment. FIG. 9 illustrates a second channel envelope within a first channel by illustrating amplitude shifts over time. In the illustrative example, waveform 900 is the entire plot showing a first channel and a second channel shown by amplitude shifts. In the illustrative example, a second channel is shown with a laser bias modulation in which a low data transmission rate waveform is superimposed onto a high data transmission rate waveform by amplitude shifts as explained further below.

In the illustrative example of FIG. 9, high data transmission rate ones and zeros 980 are illustrated in a manner of an oscilloscope screen where amplitude is plotted on an "x" axis 920 against time plotted on a "y" axis 910. In an example, high data transmission rates ones and zeros 980 are exemplary of first channel communications between first communication circuits such as first communication circuit 326 in device 322 and first communication circuit 348 in switch 340 in FIG. 3. In another example, high data transmission rates ones and zeros 980 are exemplary of first channel communications between first communication circuits A 454 through E 494 in devices A 450 through E 490 and first communication circuits A 440 through E 438 in switch 410 in FIG. 4.

High data transmission rate ones and zeros are shown throughout the waveform. Low data rate ones and zeros are shown by health data logic "1" 930, health data logic "0" 940, health data logic "1" 950, health data logic "0" 960, and health data logic "1" 970. In an example, low data rate ones and zeros 930, 940, 950, 960, and 970 are exemplary of communication between second communication circuits such as second communication circuit 336 in device 322 and second communication circuit 345 in switch 340 in FIG. 3. In an example, low data rate ones and zeros 930, 940, 950, 960, and 970 are exemplary of communication between second communication circuits such as second communication circuits in health assembly A 458 through E 498 and second communication circuits A 411 through E 427 in switch 410 in FIG. 4.

Thus, low data transmission rate ones and zeros are transmitted at a lower rate of transmission. This lower data transmission rate may be used as a second channel. In the illustrative embodiments, the second channel may be an auxiliary virtual channel for any health information to be exchanged within a fiber optic network. In an advantageous embodiment, data received through such a second channel may be stored at a common storage capability for the network transceiver.

Figure 10:
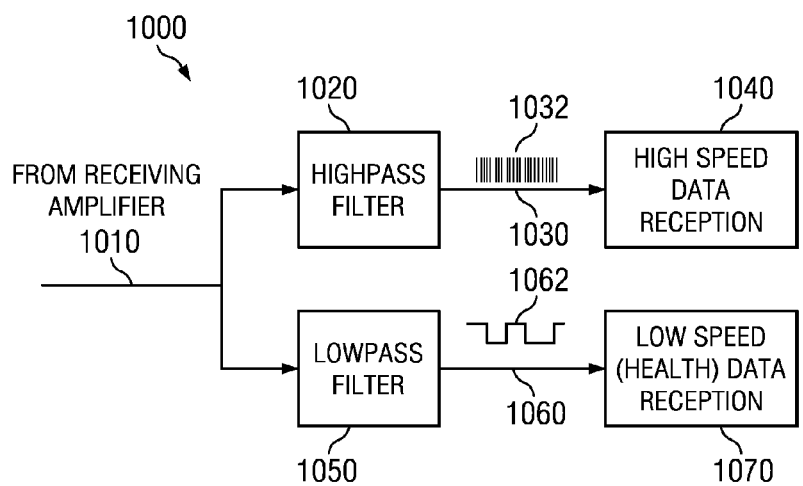
FIG. 10 is an illustration of a filter to separate high data transmission rate data from low data transmission rate data in accordance with an advantageous embodiment.

FIG. 10 is an illustration of a filter to separate high data transmission rate data from low data transmission rate data in accordance with an advantageous embodiment. A light signal is received in line 1010 from a receiving amplifier such as amplifier 522 in FIG. 5. A high pass filter 1020 allows high data rate transmission data 1032 to enter high speed data reception 1040 through line 1030. A low pass filter 1050 allows low data transmission rate data 1062 to be stored in low data transmission rate reception 1070 through line 1060.

Figure 11:
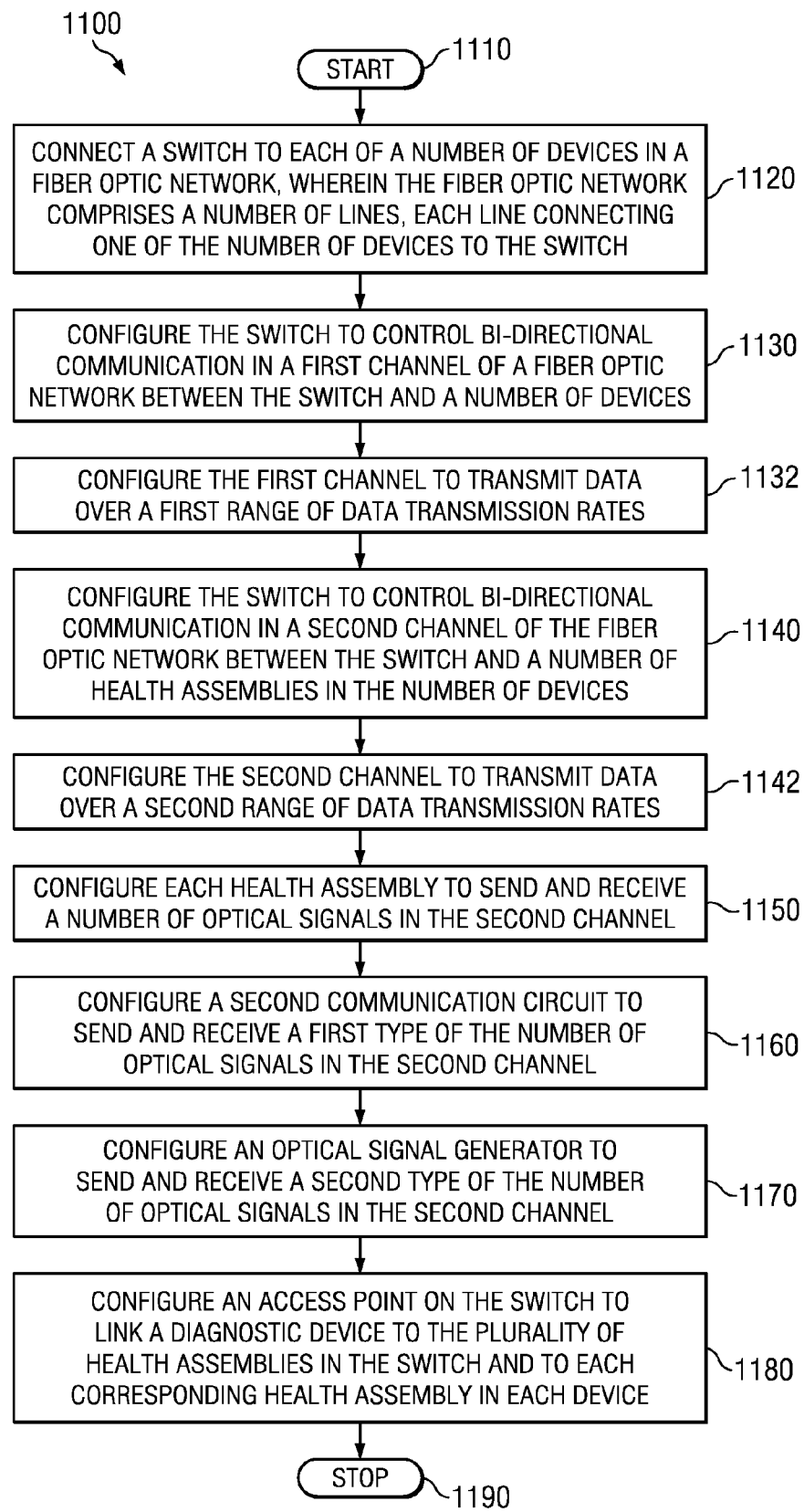
FIG. 11 is an illustration of a flowchart of a configuration process in accordance with an advantageous embodiment.

FIG. 11 is an illustration of a flowchart of a configuration process in accordance with an advantageous embodiment. As used herein, "configuring" means to manufacture, to modify by altering or adding to, or to instruct by sending instructions to a processing unit connected to or part of a device or switch. FIG. 11 is a process that may be used to configure aircraft maintenance environment 300 in FIG. 3 by connecting devices 320 to switch 360. In another example, process 1100 may be used to configure device A 450 through device E 490 to communicate in a first channel and a second channel with switch 410 in FIG. 4.

Process 1100 begins (operation 1110) and connects a switch to each of a number of devices in a fiber optic network, wherein the fiber optic network comprises a number of lines, each line connecting one of the number of devices to the switch (operation 1120). The switch may be a switch such the illustrative examples of switch 340 in FIG. 3 and switch 410 in FIG. 4. Process 1100 configures the switch to control bi-directional communication in a first channel of a fiber optic network between the switch and a number of devices (operation 1130). The bidirectional channel may be implemented in lines such as the illustrative lines 451, 461, 471, 481, and 491 of FIG. 4.

Process 1100 configures the first channel to transmit data over a first range of data transmission rates (operation 1132). Process 1100 configures the switch to control bi-directional communication in a second channel of the fiber optic network between the switch and a number of health assemblies in the number of devices (operation 1140).

Process 1100 configures the second channel to transmit data over a second range of data transmission rates (operation 1142). Process 1100 configures each health assembly to send and receive a number of optical signals in the second channel (operation 1150). Process 1100 configures a second communication circuit to send and receive a first type of the number of optical signals in the second channel (operation 1160).

Process 1100 configures an optical signal generator to send and receive a second type of the number of optical signals in the second channel (operation 1170). A signal generator may be signal generator such as signal generators 415, 417, 423, 425, and 429 in health assemblies A 420, B 422, C 424, D 426, and E 428 in switch 410 and in each of the corresponding health assemblies in device A 450, device B 460, device C 470, device D 480, and device E 490 in FIG. 4. The signal generator may be a signal generator such as signal generator 358 in health assembly 352 in FIG. 3, and such as signal generator 332 in health assembly 330 in device 322 in FIG. 3.

Process 1100 configures an access point on the switch to link a diagnostic device to the plurality of health assemblies in the switch and to each corresponding health assembly in each device (operation 1180). The access point on the switch may be an access point such as diagnostic connector 344 in FIG. 3 and diagnostic connector 444 in FIG. 4. The access point may be configured to link a diagnostic device to the plurality of health assemblies in the switch and to each corresponding health assembly in each device, for conducting a number of bi-directional tests on each of the number of lines without disconnecting any line in the network. Process 1100 ends (operation 1190).

Figure 12:
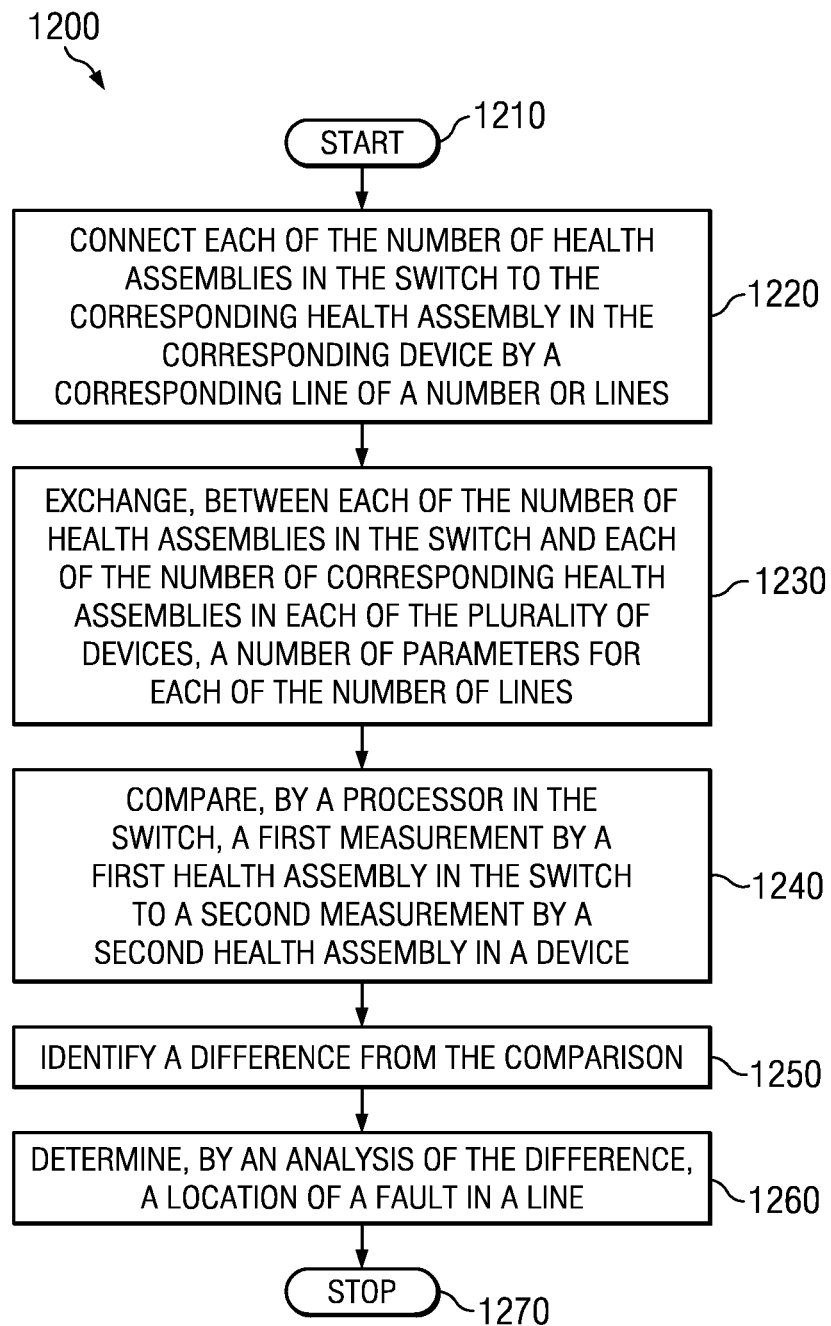
FIG. 12 is an illustration of a flowchart of a diagnostic process in accordance with an advantageous embodiment.

FIG. 12 is an illustration of a flowchart of a diagnostic process in accordance with an advantageous embodiment. Process 1200 may be used to exchange health information between a switch and a number of devices and to compare measurements between the number of devices and the switch. The number of devices and the switch may be the number of devices and the switch in FIG. 3 and in FIG. 4. The measurements may be made by the signal generators in FIG. 3 and FIG. 4 and as further discussed in FIGS. 7 and 8.

Process 1200 begins (operation 1210). Each of the number of health assemblies in the switch are connected to the corresponding health assembly in the corresponding device by a corresponding line of a number of lines (operation 1220). A number of parameters for each of the number of lines are exchanged among each of the number of health assemblies in the switch and each of the number of corresponding health assemblies in each of the plurality of devices (operation 1230).

Process 1200 compares, by a processor in the switch, a first measurement by a first health assembly in the switch to a second measurement by a second health assembly in a device (operation 1240). A difference from the comparison is identified (operation 1250).

The difference is analyzed to determine a location of a fault in a line (operation 1260). The comparing and determining operations may be performed by processing unit 342 of switch 340 or by diagnostic equipment 384 of external computing system 382 in FIG. 3. Process 1200 ends (operation 1270).

Figure 13A:
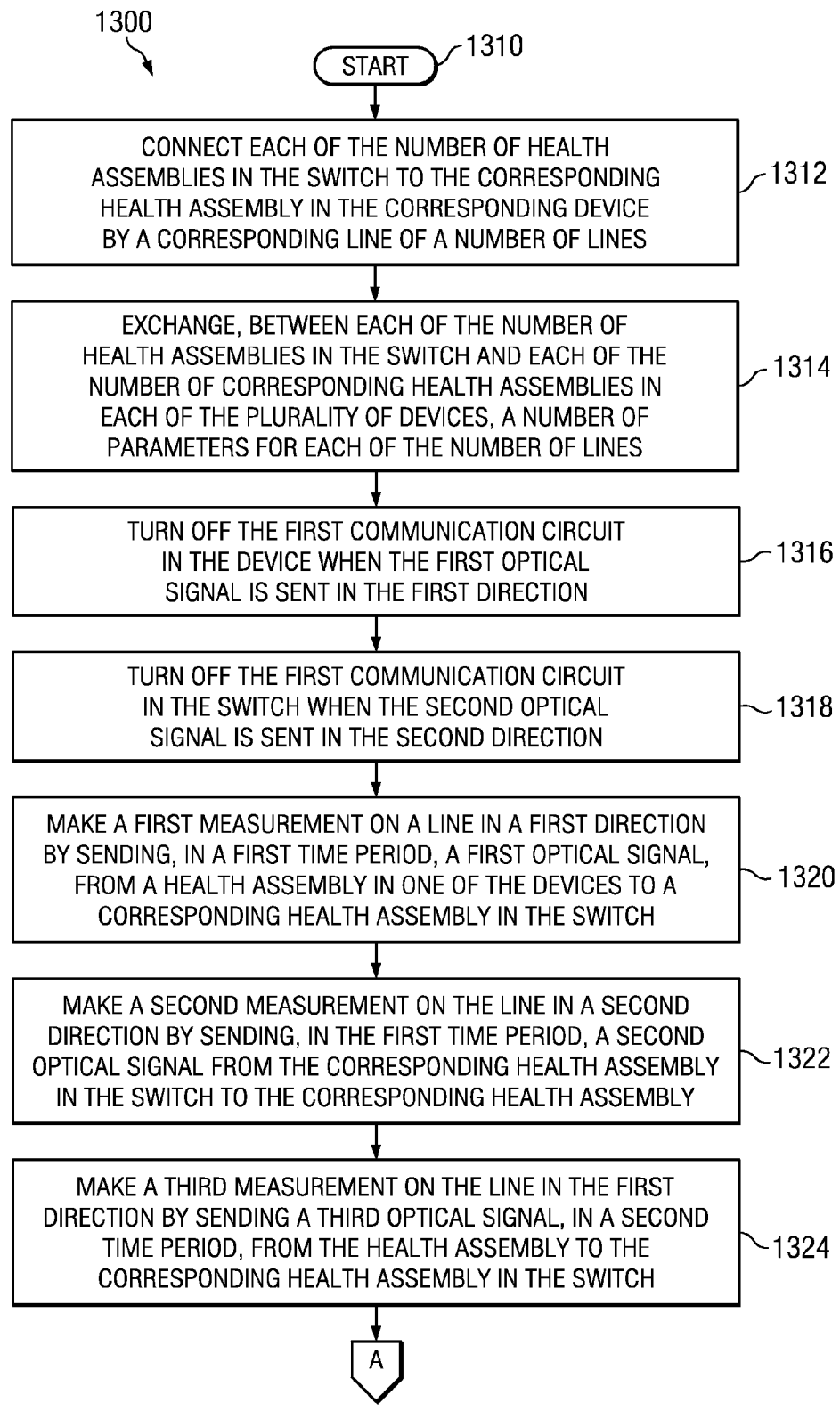
FIGS. 13A and 13B are an illustration of a flowchart of an alternate diagnostic process in accordance with an advantageous embodiment.
Figure 13B:
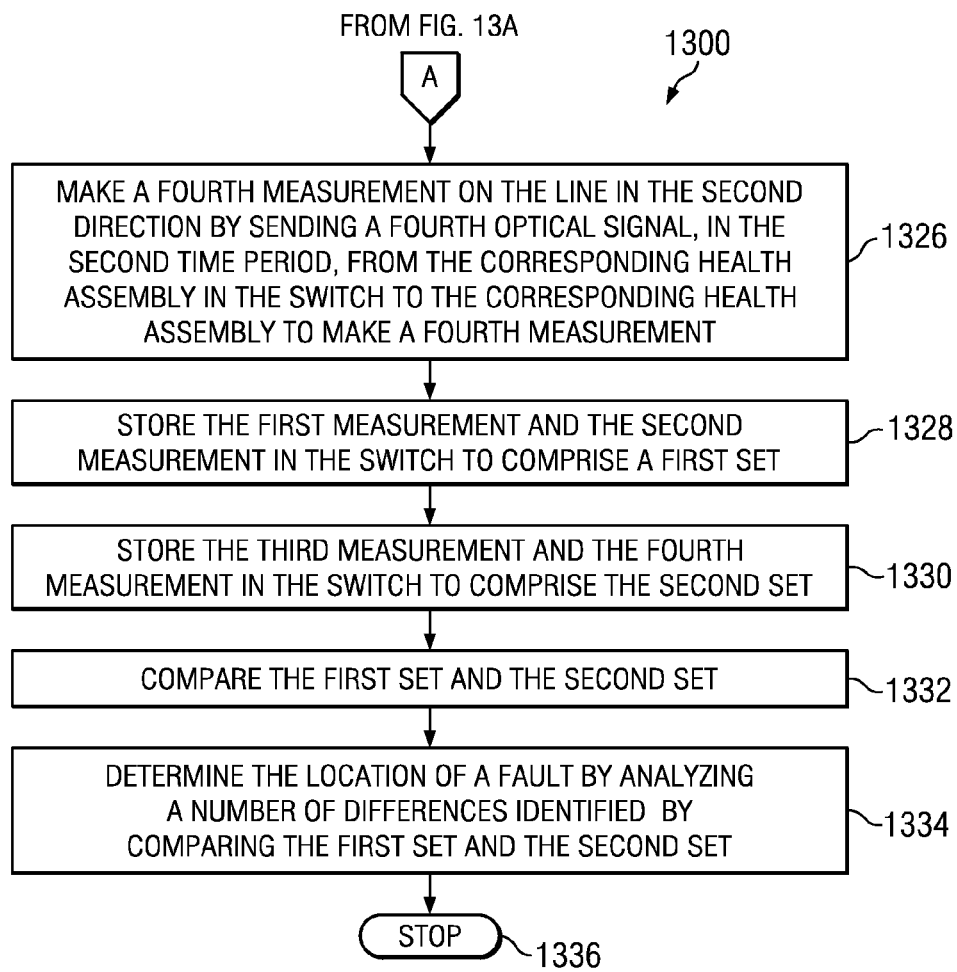

FIGS. 13A and 13B are an illustration of a flowchart of an alternate diagnostic process in accordance with an advantageous embodiment. Process 1300 may be used to exchange health information between a switch and a number of devices and to compare measurements between the number of devices and the switch. The number of devices and the switch may be the number of devices and the switch in FIG. 3 and in FIG. 4. The measurements may be made by the signal generators in FIG. 3 and FIG. 4 and as further discussed in FIGS. 7 and 8.

Process 1300 begins (operation 1310). Process 1300 connects each of the number of health assemblies in the switch to the corresponding health assembly in the corresponding device by a corresponding line of a number of lines (operation 1312).

Process 1300 exchanges a number of parameters for each of the number of lines. The exchange is among each of the number of health assemblies in the switch and each of the number of corresponding health assemblies in each of the plurality of devices, a number of parameters for each of the number of lines (operation 1314).

The first communication circuit in the device is turned off when the first optical signal is sent in the first direction (operation 1316). The first communication circuit in the switch is turned off when the second optical signal is sent in the second direction (operation 1318).

Process 1300 makes a first measurement on a line in a first direction by sending, in a first time period, a first optical signal, from a health assembly in one of the devices to a corresponding health assembly in the switch (operation 1320). In an example, the health assembly may be health assembly 330 and the first optical signal may be sent by signal generator 332 of health assembly 333 in FIG. 3. In an example, the line may be one of lines 314 in fiber optic cables 310 in FIG. 3. A second measurement is made on the line in a second direction by sending, in the first time period, a second optical signal from the corresponding health assembly in the switch to the corresponding health assembly (operation 1322). The corresponding health assembly may be a health assembly such as health assembly 352 in switch 340 in FIG. 3. In an example, the second optical signal may be sent by signal generator 358 in health assembly 350 of switch 340 in FIG. 3. Process 1300 makes a third measurement on the line in the first direction by sending a third optical signal, in a second time period, from the health assembly to the corresponding health assembly in the switch (operation 1324). In an example, the third optical signal may be sent by signal generator 332 as discussed above.

A fourth measurement is made on the line in the second direction by sending a fourth optical signal, in the second time period, from the corresponding health assembly in the switch to the corresponding health assembly to make a fourth measurement (operation 1326). Process 1300 stores the first measurement and the second measurement in the switch to comprise a first set (operation 1328). In an example, the first set may be stored in data 366 of storage 360 in switch 340 in FIG. 3. In an example, the fourth optical signal may be sent by signal generator 358 as discussed above.

Process 1300 stores the third measurement and the fourth measurement in the switch to comprise a second set (operation 1330). In an example, the second set may be stored in data 366 of storage 360 in switch 340 in FIG. 3. The first set and the second set are compared (operation 1332). A location of a fault is determined by analyzing a number of differences identified by comparing the first set and the second set (operation 1334). In an example, the comparing and the determining operations may be performed by processing unit 342 in switch 340. In another example, the comparing and the determining operations may be performed by diagnostic equipment 384 of external computing system 382 in FIG. 3. Process 1300 ends (operation 1336).

The flowcharts and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

An embodiment of the present disclosure provides an apparatus comprising a switch configured to control bi-directional communication in a first channel of a fiber optic network between the switch and a number of devices and in a second channel of the fiber optic network between the switch and a number of health assemblies in the number of devices. The fiber optic network comprises a number of lines, each line connecting one of the number of devices to the switch. Each health assembly is configured to send and receive a number of optical signals in the second channel.

In an embodiment, a method comprises connecting a switch to each of a number of devices in a fiber optic network, wherein the fiber optic network comprises a number of lines, each line connecting one of the number of devices to the switch, configuring the switch to control bi-directional communication in a first channel of a fiber optic network between the switch and the number of devices, configuring the switch to control bi-directional communication in a second channel of the fiber optic network between the switch and a number of health assemblies in the number of devices, and configuring each health assembly to send and receive a number of optical signals in the second channel.

The features, functions, and advantages can be achieved independently in various embodiments of the present disclosure or may be combined in yet other embodiments in which further details can be seen with reference to the following description and drawings.

For example, the different advantageous embodiments recognize and take into account that providing a separate and independent channel for communication between avionics devices and a switch in a fiber optic network, may allow the avionics devices and the switch to exchange health information and interactively determine faults without requiring any intervention on the part of the processing unit for an avionics device.

The different advantageous embodiments recognize and take into account that if avionics devices and a switch exchange and store health information about fiber optic lines connecting the avionics devices to the switch, the avionics devices and the switch can interactively diagnose faults and then route the information within the network to a central reporting node, all independent of the avionics devices' central processing units.

The different advantageous embodiments recognize and take into account that a low data rate subcarrier can be used as an auxiliary virtual channel for any health information to be exchanged within a fiber optic network. The different advantageous embodiments recognize and take into account that concentrating all health information for the network at a single node may increase access for a technician. A signal node may be an access point such as diagnostic connector 344 in FIG. 3 and diagnostic connector 444 in FIG. 4.

The different advantageous embodiments recognize and take into account communication between avionics devices and a switch using electronic modulation of the laser bias current as the means of communicating, a central health information access point, and a two-way exchange of health information between avionics devices and a switch provides a network health information channel. The central health information access point may be an access point such as diagnostic connector 344 in FIG. 3 and diagnostic connector 444 in FIG. 4. Such a network health information channel may create a virtual channel on top of the main data channel that is completely independent and isolated from the main data channel.

Thus, a number of the advantageous embodiments provide a method and apparatus providing a switch configured to control bi-directional communication in a first channel of a fiber optic network between the switch and a number of devices and in a second channel of the fiber optic network between the switch and a number of health assemblies in the number of devices. The fiber optic network comprises a number of lines, each line connecting one of the devices to the switch. Each health assembly is configured to send and receive a number of optical signals in the second channel.

The different advantageous embodiments can take the form of an entirely hardware embodiment, an entirely software embodiment, or an embodiment containing both hardware and software elements. Some embodiments are implemented in software, which includes, but is not limited to, forms such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation, an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example, without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters and are just a few of the currently available types of communications adapters.

The description of the different advantageous embodiments has been presented for purposes of illustration and description, and it is not intended to be exhaustive or limited to the embodiments in the form disclosed. Many modifications and variations will be apparent to those of ordinary skill in the art.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
   a switch configured to control bi-directional communication in a first channel of a fiber optic network between the switch and a number of devices using a first communication circuit and in a second channel of the fiber optic network between a first number of health assemblies in the switch and a second number of health assemblies in the number of devices;
   wherein the fiber optic network comprises a number of lines, each line connecting one of the number of devices to the switch;
   wherein each health assembly of the first number of health assemblies and the second number of health assemblies is configured to exchange a number of optical signals in the second channel to form exchanged optical signals;
   wherein the switch is configured to analyze the exchanged optical signals to locate faults within the apparatus; and
   wherein the switch and the number of devices are installed aboard an aircraft and the number of devices comprise avionics devices.

2. The apparatus of claim 1, wherein each of the first number of health assemblies and the second number of health assemblies further comprises:
   a second communication circuit configured to send and receive a first type of the number of optical signals in the second channel; and
   an optical signal generator configured to send and receive a second type of the number of optical signals in the second channel.

3. The apparatus of claim 2 further comprising:
   an access point on the switch configured to link a diagnostic device to the first number of health assemblies in the switch and to each corresponding health assembly of the second number of health assemblies in each device, for conducting a number of bi-directional tests on each of the number of lines without disconnecting any line in the network.

4. The apparatus of claim 1, wherein each of the number of health assemblies of the first number of health assemblies in the switch exchange a number of parameters with each of the second number of corresponding health assemblies of the second number of health assemblies in the devices for each of the number of lines.

5. The apparatus of claim 4 further comprising:
   wherein each of the number of health assemblies in the first number of health assemblies in the switch are connected to the corresponding health assembly in the second number of health assemblies in the corresponding device by a corresponding line of the number of lines; and
   wherein the number of health assemblies in the first number of health assemblies in the switch interact with the number of corresponding health assemblies of the second number of health assemblies in each of the number of devices to determine a number of locations of a number of faults in a number of corresponding lines.

6. The apparatus claim 3 further comprising:
   a first time period in which a health assembly of the first number of health assemblies in one of the devices sends a first optical signal to a corresponding health assembly of the second number of health assemblies in the switch to make a first measurement on a line in a first direction and in which the corresponding health assembly of the first number of health assemblies in the switch sends a second optical signal to the corresponding health assembly in the second number of health assemblies on the line to make a second measurement in a second direction.

7. The apparatus of claim 6 further comprising:
a second time period in which the health assembly of the second number of health assemblies sends a third optical signal to the corresponding health assembly of the first number of health assemblies in the switch to make a third measurement on the line in a first direction and in which the corresponding health assembly of the first number of health assemblies in the switch sends a fourth optical signal to the corresponding health assembly of the second number of health assemblies to make a fourth measurement on the line in the second direction.

8. The apparatus of claim 7 further comprising:
wherein the first measurement and the second measurement are stored in the switch to comprise a first set, and the third measurement and the fourth measurement are stored in the switch to comprise a second set; and
wherein a fault is located by analyzing a number of differences identified by comparing the first set and the second set.

9. The apparatus of claim 3 further comprising:
wherein the optical signal generator is an optical time domain reflectometer; and
wherein the switch comprises of one of an electrical-to-optical-to-electrical switch and an optical-to-electrical-to-optical switch.

10. The apparatus of claim 1, wherein the first channel is configured to transmit data over a first range of data transmission rates and the second channel is configured to transmit data over a second range of data transmission rates.

11. The apparatus claim 6 further comprising:
wherein the first communication circuit in the device is turned off when the first optical signal is sent in the first direction;
wherein the first communication circuit in the switch is turned off when the second optical signal is sent in the second direction; and
wherein a processor in the switch compares the first measurement to the second measurement to locate a fault.

12. The apparatus of claim 6, wherein the first measurement and the second measurement are each generated without disconnecting any fiber optic connection in the fiber optic network.

13. The apparatus of claim 10 further comprising:
wherein the first data transmission rate range has a highest value of 100 kbps; and
wherein the second data transmission rate range has a lowest value of 1 Gbps.

14. A method comprising:
connecting a switch to each of a number of devices in a fiber optic network, wherein the fiber optic network comprises a number of lines, each line connecting one of the number of devices to the switch, wherein the switch is installed aboard an aircraft, and wherein the number of devices comprise avionics devices;
configuring the switch to control bi-directional communication in a first channel of a fiber optic network between the switch and the number of devices using a first communication circuit;
configuring the switch to control bi-directional communication in a second channel of the fiber optic network between a first number of health assemblies in the switch and a second number of health assemblies in the number of devices; and
configuring each health assembly in the first number of health assemblies and in the second number of health assemblies to send and receive a number of optical signals in the second channel, wherein exchanged optical signals are formed; and
analyzing, using the switch, the exchanged optical signals to locate faults within the apparatus.

15. The method of claim 14 further comprising:
configuring a second communication circuit to send and receive a first type of the number of optical signals in the second channel; and
configuring an optical signal generator to send and receive a second type of the number of optical signals in the second channel.

16. The method of claim 15 further comprising:
configuring an access point on the switch to link a diagnostic device to the plurality of the first number of health assemblies in the switch and to each corresponding health assembly of the second number of health assemblies in each device, for conducting a number of bi-directional tests on each of the number of lines without disconnecting any line in the network.

17. The method of claim 14 further comprising:
exchanging, between each of the number of health assemblies of the first number of health assemblies in the switch and each of the number of corresponding health assemblies of the second number of health assemblies, a number of parameters for each of the number of lines.

18. The method of claim 17 further comprising:
connecting each of the number of the first number of health assemblies in the switch to the corresponding health assembly of the second number of health assemblies in the corresponding device by a corresponding line of the number of lines; and
determining, by an interaction of the number of health assemblies of the first number of health assemblies in the switch with the number of corresponding health assemblies of the second number of health assemblies in each of the number of devices, a number of locations of a number of faults in a number of corresponding lines.

19. The method of claim 15 further comprising:
making a first measurement on a line in a first direction by sending, in a first time period, a first optical signal, from a health assembly of the second number of health assemblies in one of the devices to a corresponding health assembly of the first number of health assemblies in the switch; and
making a second measurement on the line in a second direction by sending, in the first time period, a second optical signal from the corresponding health assembly of the first number of health assemblies in the switch to the corresponding health assembly of the second number of health assemblies in the one of the devices.

20. The method of claim 19 further comprising:
making a third measurement on the line in the first direction by sending a third optical signal, in a second time period, from the health assembly of the second number of health assemblies to the corresponding health assembly of the first number of health assemblies in the switch; and
making a fourth measurement on the line in the second direction by sending a fourth optical signal, in the second time period, from the corresponding health assembly of the first number of health assemblies in the switch to the corresponding health assembly of the second number of health assemblies to make a fourth measurement.

21. The method of claim 20 further comprising:
storing the first measurement and the second measurement in the switch to comprise a first set;

storing the third measurement and the fourth measurement in the switch to comprise a second set; and determining a location of a fault by analyzing a number of differences identified by comparing the first set and the second set.

22. The method of claim 16 further comprising:

providing an optical time domain reflectometer for the signal generator; and providing one of an electrical-to-optical-to-electrical-switch and an optical-to-electrical-to-optical switch for the switch.

23. The method of claim 15 further comprising:

configuring the first channel to transmit data over a first range of data transmission rates; and configuring the second channel to transmit data over a second range of data transmission rates.

24. The method of claim 19 further comprising:

turning off the first communication circuit in the device when the first optical signal is sent in the first direction;

turning off the first communication circuit in the switch when the second optical signal is sent in the second direction; and comparing, by a processor in the switch, the first measurement to the second measurement to locate a fault.

25. The method of claim 19 further comprising:

generating each first measurement and each second measurement without disconnecting any fiber optic connection in the fiber optic network.

\* \* \* \* \*